(12) United States Patent  (10) Patent No.: US 6,974,184 B1
Moffa et al.  (45) Date of Patent: Dec. 13, 2005

(54) LOCKING MECHANISM ASSEMBLY FOR A CANTILEVERED STOWABLE SEAT

(75) Inventors: Michael D. Moffa, Morton, IL (US); Benjamin N. Huyck, Skokie, IL (US)

(73) Assignee: Freedman Seating Company, Chicago, IL (US)

( * ) Notice: Subject to any disclaimer, the term of this patent is extended or adjusted under 35 U.S.C. 154(b) by 0 days.

(21) Appl. No.: 11/081,312

(22) Filed: Mar. 16, 2005

(51) Int. Cl.$^7$ ................................................. B60N 2/32
(52) U.S. Cl. ........................................................ 297/14
(58) Field of Search ............................... 297/14, 452.39, 297/378.1, 378.12, 324, 335, 334, 331; 248/188.6, 248/188.1; 296/65.11, 65.09, 65.05

(56) References Cited

U.S. PATENT DOCUMENTS

| | | | |
|---|---|---|---|
| 5,489,141 A | 2/1996 | Strausbaugh | |
| 5,492,389 A | 2/1996 | McClintock | |
| 5,984,397 A | 11/1999 | Dawson | |
| 6,106,066 A | 8/2000 | Moffa | |
| 6,343,834 B1 | 2/2002 | Wurmlinger | |
| 6,460,929 B2 | 10/2002 | Kamida | |
| 6,540,294 B2 | 4/2003 | Moffa | |
| 6,601,901 B1 | 8/2003 | Schambre | |
| 6,843,526 B2 * | 1/2005 | Honda et al. | ................. 297/14 |

* cited by examiner

Primary Examiner—Milton Nelson, Jr.

(57) ABSTRACT

An improved locking mechanism assembly that is within a cantilevered stowable seat for use in a vehicle in order to provide passenger seating or a space for a wheelchair or for storage of various articles. The improved locking mechanism assembly includes an aisle assembly, a wall assembly, and a transfer rod. The seat is stowed by folding the seatback flat against the seatbase, actuating the single handle located on the aisle side of the seat thereby unlocking the seatbase from its folded intermediate position and rotating the seatbase to its stowed position where it is locked in place. The stowable seat is deployed by actuating the single handle located on the aisle side of the seat assembly, thereby unlocking the seatbase from its stowed position and lowering the seatbase to its folded intermediate position where it is locked into place. The seatback is then unfolded to accommodate passengers in the deployed position.

7 Claims, 4 Drawing Sheets

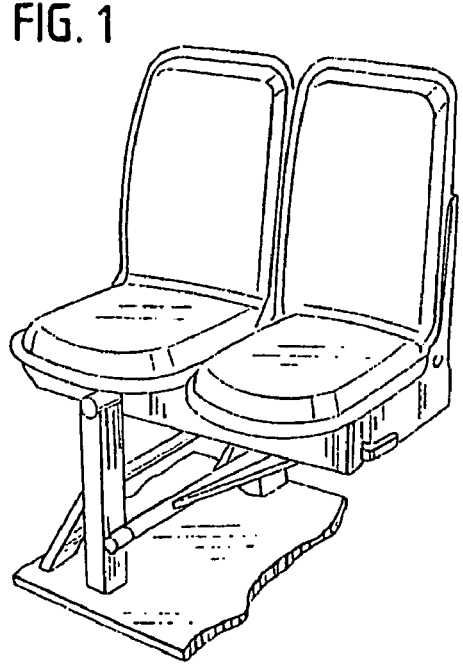
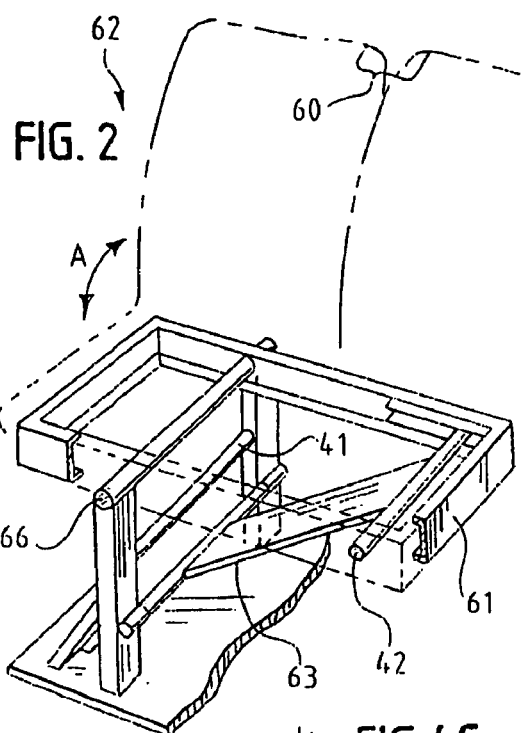
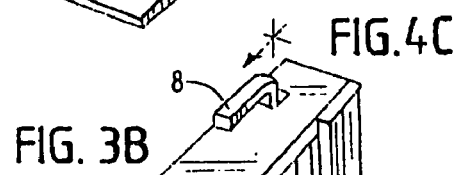
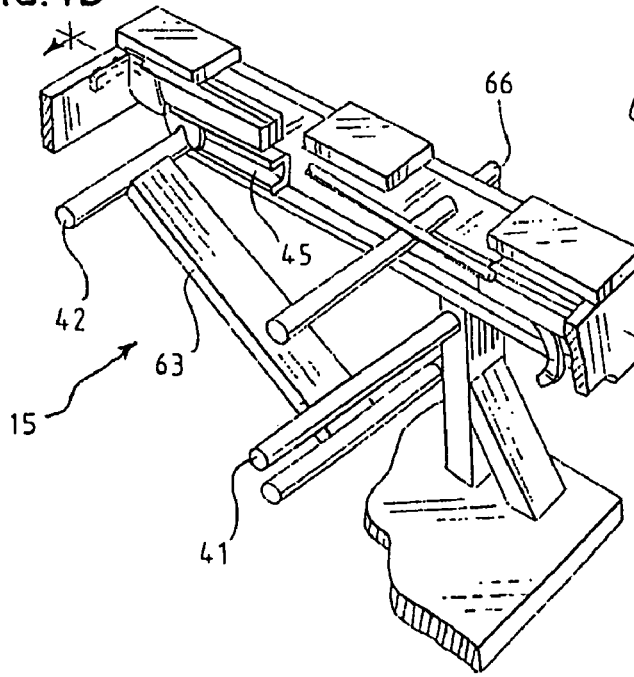
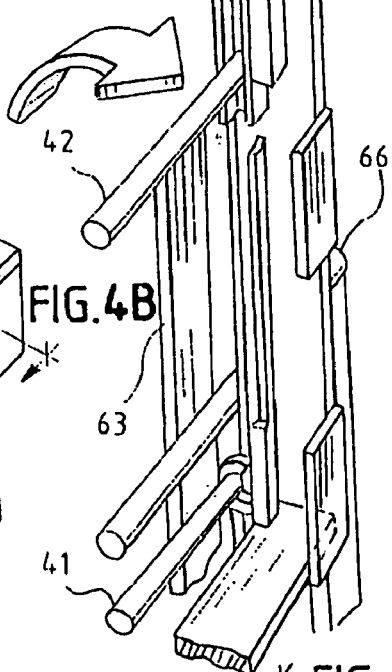

LOCKING MECHANISM ASSEMBLY FOR A CANTILEVERED STOWABLE SEAT

BACKGROUND OF THE INVENTION

The present invention relates generally to an improved locking mechanism assembly that is within a cantilevered stowable seat for use in a vehicle to provide seating for passengers with the option of providing a space for a wheelchair or for storage of various articles. The invention preferably employs a cantilevered seatbase which pivots about one end from a deployed position to a stowed position, where a diagonal truss supports the rotation of the cantilevered seatbase from the deployed position to the stowed position. The seatbase is provided with a seatback having a lockable unfolded position where the seatback is raised to accommodate passengers, as well as a lockable folded intermediate position where the seatback is folded against the seatbase. The cantilevered stowable seat is stowed by folding the seatback to the folded intermediate position, actuating the single handle located on the aisle side of the seat thereby unlocking the seatbase from its folded intermediate position and raising the seatbase to its stowed position where it is locked in place. The stowable seat is deployed by actuating the single handle located on the aisle side of the seat assembly, thereby unlocking the seatbase from its stowed position and lowering the seatbase to its folded intermediate position where it is locked into place. The seatback is then unfolded to accommodate passengers in the deployed position.

The current state of the art teaches cantilevered seats employing two separate and distinct mechanical locks used to secure the seat assembly or a foot actuator and release pin combination. Both prior art methods have multiple steps and handles. Similar to U.S. Pat. No. 5,492,389 ('389), one handle and mechanical lock secures the seatbase in the deployed position, and a second handle and mechanical lock secures the seatbase in the stowed position. The '389 patent teaches two distinct and separate handles on either end of a runner track. The runner track has a sliding member that travels along the track to provide translational motion to the supporting diagonal truss, thus enabling rotation from a stowed to a deployed position. A downlock and an uplock mechanism are used to hold the sliding member in place to lock the seat in the stowed or deployed position. This invention overcomes the disadvantage of a two handle, multiple step process with one handle activation.

Another example of prior art is U.S. Pat. No. 5,489,141 ('141). The '141 device teaches a stowable seat with a seatbase and supporting member, a sliding assembly interconnecting the support member, and a pivoting assembly interconnecting the support member and permitting the base to pivot from a stowed or deployed position. The '141 device has several steps of operation and a multi-step lock and pin mechanism which holds the seat in either the stowed or deployed positions. Both of these problems are eliminated by this invention. Specifically, an operator with the '141 patent must first lower the seat back and then press a foot actuator to release the pivotable leg from the floor. The operator then lifts the pivotable leg out of two slots in the floor. When the pivotable leg reaches the retracted position, two pins are snapped into two boars. Utilizing a push bar to raise the seatbase, a system of tubes and rods are used in connection with a set of pins to lock the seatbase in the retracted position. When force is applied to the push bar, the rods slide into the tubes until the pins click into the aligned bores on the tubes and rods. Another embodiment includes a pull ring where the pins are inserted or removed manually instead of the system of tubes and rods.

This invention overcomes the '141's multiple steps and problems by having one handle that actuates both locking mechanisms within the seatbase for the stowed and deployed positions. Also, there is also only one leg in this invention instead of the complicated foot actuated system that releases the pivotable leg in the '141 patent. This invention teaches a more efficient method to lock a cantilevered stowable seat in the stowed and deployed positions with fewer parts and steps, while maintaining the structural integrity necessary for a seat component to be used in a rigorous commercial setting.

SUMMARY OF THE INVENTION

Accordingly, it is an object of the present invention to provide a cantilevered stowable seat for mounting within a vehicle with an improved locking mechanism assembly wherein a space may be selectively provided for positioning a wheelchair or article adjacent to the stowed seat. The cantilevered stowable seat comprises a seatback, a seatbase, and a seat framework. The improved locking mechanism is found within the seat framework and comprises an aisle assembly, a wall assembly, and a transfer rod. In addition, this invention can be utilized with other seat mechanisms that have deployed and stowed positions where the same or similar problems are present involving the need for multiple steps in fastening and releasing a seat to enable it to go between a deployed and stowed position. These problems are overcome by this invention with the use of a handle to provide one hand control to go from the folded intermediate position to the stowed position. As noted in U.S. Pat. No. 5,492,389, it is an object of this invention to provide a cantilevered stowable seat which is readily mounted in place and avoids the use of protruding legs which may interfere with an operator.

Moreover, the seatback and seatbase cooperate with the diagonal truss and sliding bar combination within the seat framework. The seatbase has a sliding bar within a runner track and is supported by a diagonal truss when in the deployed position. The seatbase has a free end pivotably mounted on an axis associated with the seat framework, movable through a range of positions between a stowed position providing space for articles, to a folded intermediate position where the seat back is folded over the seatbase, to the deployed position where the seatback is unfolded to provide seating for passengers.

The seat framework has an improved locking mechanism assembly comprising a wall assembly, an aisle assembly, and a movable transfer rod. This locking mechanism assembly, through the use of a handle, enables one hand control from the folded intermediate position to the stowed position.

BRIEF DESCRIPTION OF THE DRAWINGS

In order to satisfy the objects of the invention discussed herein, a cantilevered stowable seat for mounting to a support member of a vehicle with an improved locking mechanism assembly is provided as illustrated by the accompanying drawings wherein:

FIG. 1 is a perspective view of the cantilevered stowable seat with the exterior shell of the seat included;

FIG. 2 is a perspective view of the cantilevered stowable seat with the exterior shell of the seatbase cutaway to expose the seat framework;

FIG. 3A is a perspective view of the seat framework with the cantilevered seatbase cut away in the deployed and folded intermediate positions, revealing the base bar that the wall assembly grips, the diagonal truss, the runner track, and the sliding bar that travels along the runner track;

FIG. 3B is a perspective view of the seat framework with the shell of the seatbase cut away in the stowed position revealing the base bar that the wall assembly grips, the diagonal truss, the runner track, and the sliding bar that travels along the runner track. Moreover, this view illustrates the stowed position where the operator can have the option of placing a wheel chair or other article adjacent to the cantilevered stowable seat;

DETAILED DESCRIPTION OF THE PREFERRED EMBODIMENTS

Figure 4A:
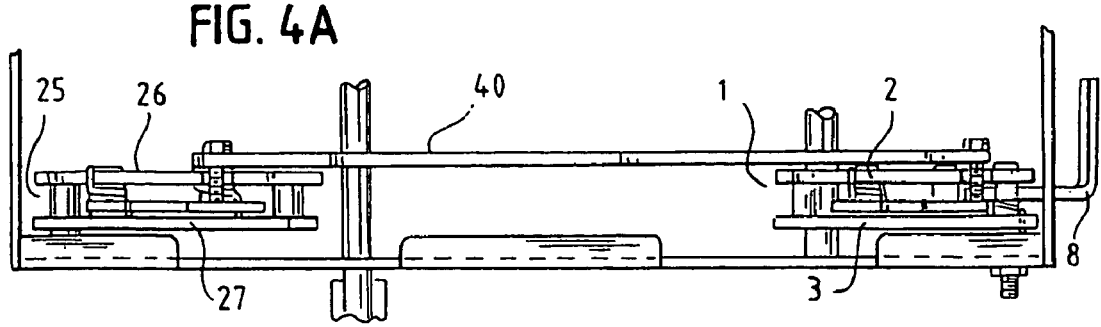
FIG. 4A is a top view of the improved locking mechanism assembly.
Figure 4B:
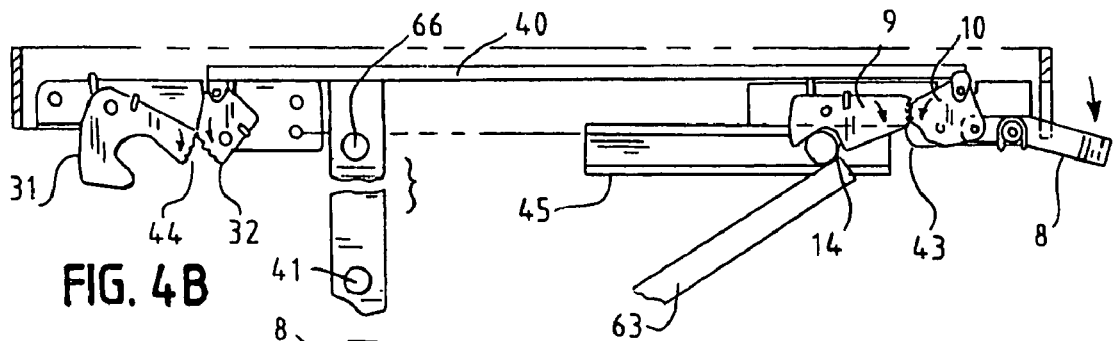
FIG. 4B is a side view of the improved locking mechanism assembly in the deployed position and the folded intermediate position. The arrows illustrate the directional movement of the components within the improved locking mechanism assembly.
Figure 4C:
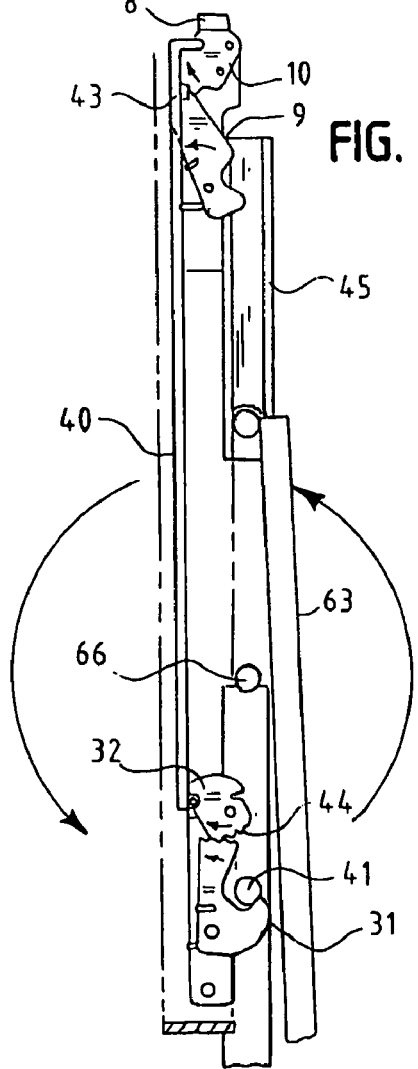
FIG. 4C is a side view of the improved locking mechanism assembly in the stowed position. The arrows illustrate the directional movement of the components within the improved locking mechanism assembly along with the directional movement of the seatbase from the folded intermediate position to the stowed position.
Figure 5A:
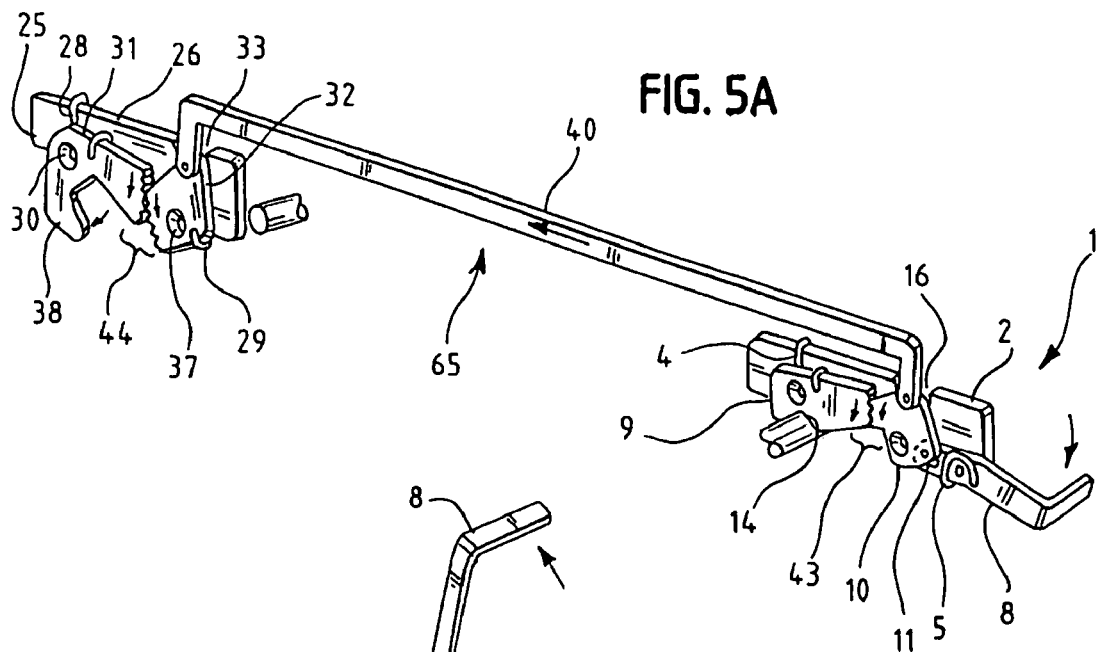
FIG. 5A is a perspective view of the improved locking mechanism assembly in the deployed position and the folded intermediate position. The arrows illustrate the direction in which the individual parts move with relation to the implementation of a force on the handle.
Figure 5B:
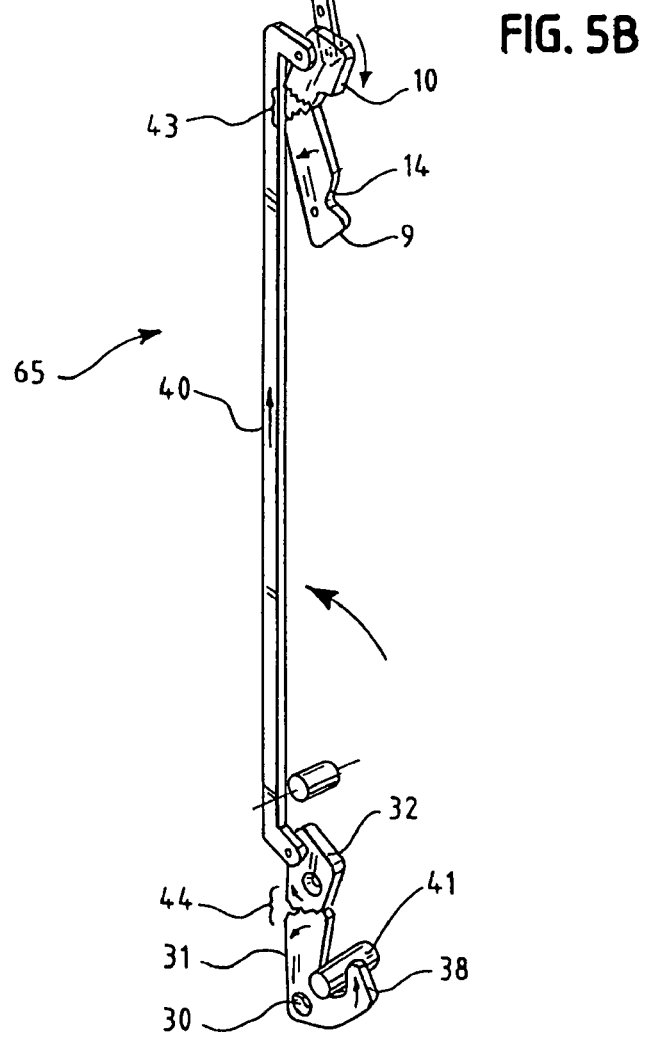
FIG. 5B is a perspective view of the improved locking mechanism assembly in the stowed position. The arrows illustrate the direction in which the individual parts move with relation to the implementation of a force on the handle.

The improved locking mechanism assembly comprises aisle assembly 1, wall assembly 25, and transfer rod 40 as illustrated in FIGS. 5A and 5B. As in U.S. Pat. No. 5,492,389 and in reference to FIG. 1, this invention deals with applications and mechanisms involving a cantilevered stowable seat. The cantilevered stowable seat of this invention generally is designated by the reference numeral 62. As shown in FIGS. 2, 4A, 4B, and 4C, the cantilevered stowable seat 62 includes at least one seatback 60, at least one seatbase 61, and a seat framework 15. Seat framework 15 comprises of an improved locking mechanism assembly 65 and diagonal truss 63 having a slidably mounted relationship with sliding bar 42.

In operation, cantilevered stowable seat 62 is typically utilized with seatbase 61 in the deployed position and seatback 60 in an unfolded position as illustrated in FIG. 1. Seatback 60 has a range of motion as indicated by arrow A. Seatback 60 is folded over flat against seatbase 61 to the folded intermediate position and seatbase 61 is raised to its stowed position to provide space for a wheel chair or other such article. Mounting of the stowable seat to a wall in a transportation vehicle or other host can be performed in an improved manner consistent with the linkages and principles set forth in U.S. Pat. No. 5,492,389.

As illustrated in FIGS. 2, 3A, and 3B, seatbase 61 is generally rectangular being removably attached to seat framework 15. Seat framework 15 is supported by diagonal truss 63 and sliding bar 42. Seatback 60 and seatbase 61 can be described in a manner consistent with the principles set forth in the prior art U.S. Pat. No. 5,492,389, and as illustrated in FIGS. 3A and 3B. To provide seatbase 61 with a range of motion extending from the deployed position to the stowed position, sliding bar 42 slides between the two positions via runner track 45 as shown in U.S. Pat. No. 5,492,389 and as illustrated in FIGS. 3A and 3B. Diagonal truss 63 and sliding bar 42 may be locked and or unlocked in the deployed position, folded intermediate position, or the stowed position with the improved locking mechanism assembly comprising aisle assembly 1, wall assembly 25, and transfer rod 40.

Figure 6:
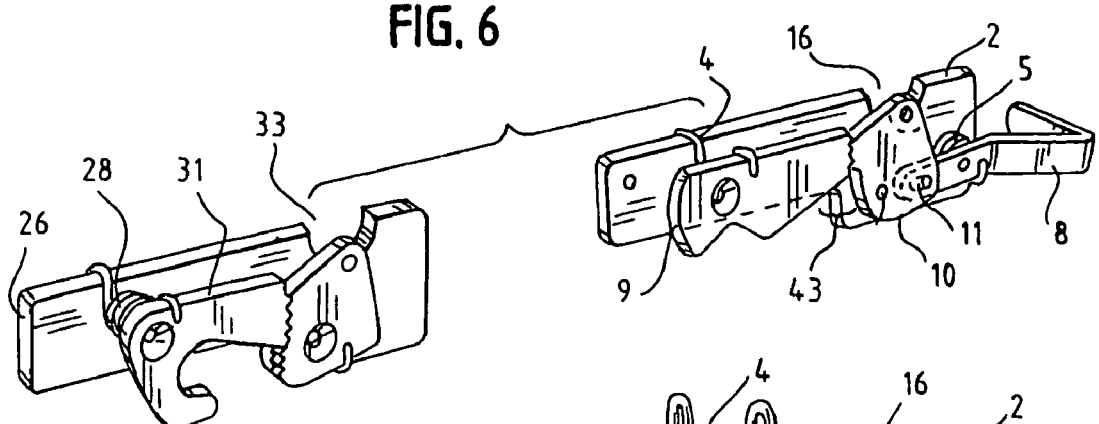
FIG. 6 is a perspective exploded view of the aisle assembly and the wall assembly.
Figure 7:
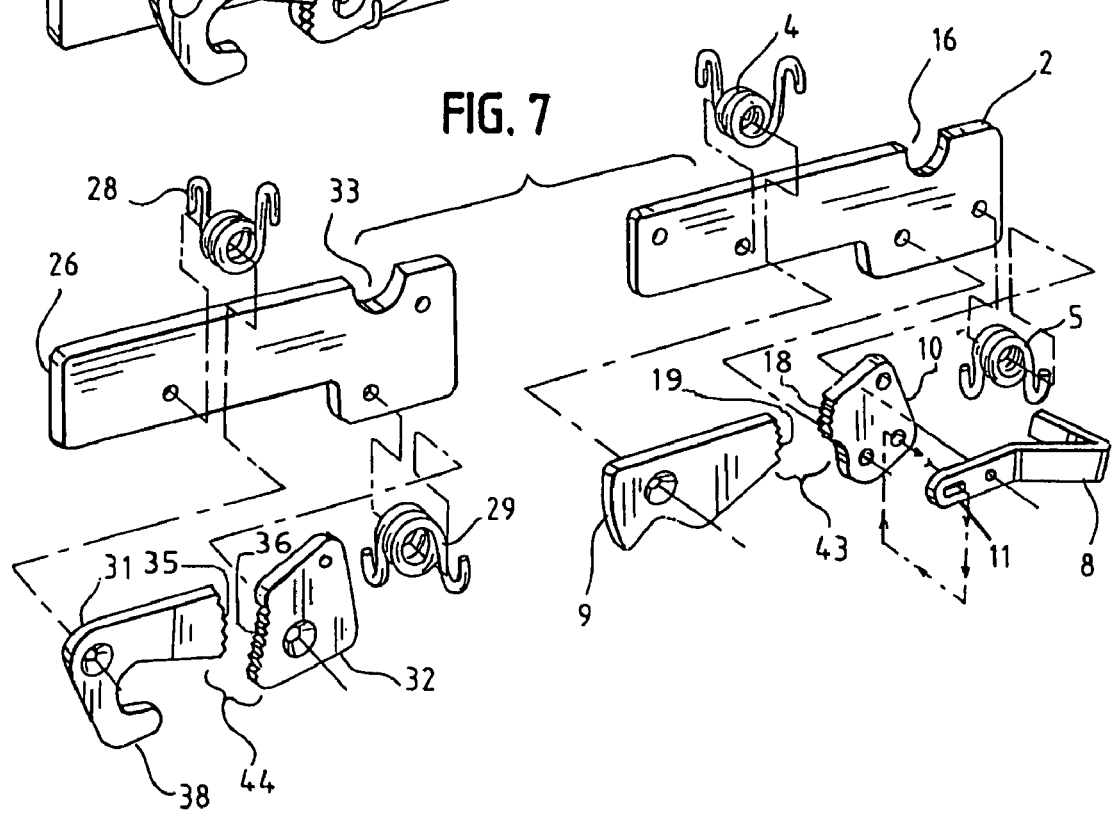
FIG. 7 is an exploded perspective view of the aisle assembly and the wall assembly.
Figure 8:
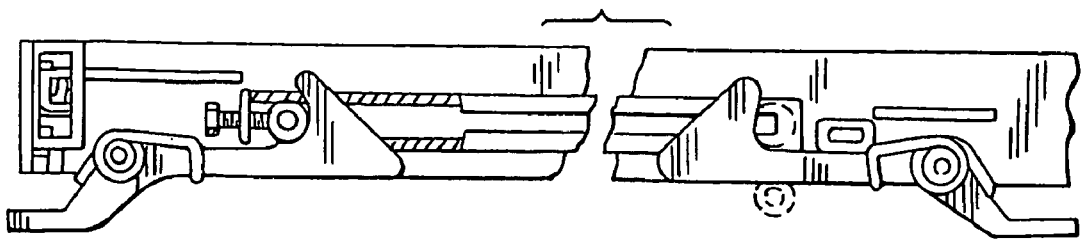
FIG. 8 is an illustration of prior art with regard to a two handled locking mechanism from U.S. Pat. No. 5,492,389.

Referring to FIGS. 4A, 6 and 7, the aisle assembly 1 includes inner plate 2 and outer plate 3 removably attached at either end to protect and partially enclose the components of aisle assembly 1. Inner plate 2 includes a U-shaped cut out 16 enabling an aisle keep 10 to be rotatably attached to transfer rod 40 by a bolt. In the deployed position and the folded intermediate position, aisle assembly 1 is locked and aisle sear 9 has a hold on sliding bar 42 via V-shaped cut out 14 preventing movement in runner track 45 towards the stowed position. Aisle sear 9 is biased downward by an aisle spring 4 that is removably attached to inner plate 2. As illustrated in FIGS. 4A and 5A, this locking is accomplished through the relationship of aisle sear 9 and aisle keep 10. Both aisle sear 9 and aisle keep 10 have toothed side 19 and 18 respectively. These toothed sides meet and are constrained in the locked position and free in the unlocked position. Handle 8 has a relationship with aisle keep 10 and aisle sear 9 to transfer a force applied at handle 8. Handle 8 has a keep slot 11 to be rotatably attached to aisle keep 10. Additionally, handle 8 is biased in a locked position by a door spring 5 that is removably attached to outer plate 3. An operator applies a force to handle 8 causing aisle keep 10 to rotate counterclockwise. This rotation drives both aisle sear 9 and transfer rod 40. Clockwise rotation is transferred to aisle sear 9 via tooth contact region 43. This clockwise rotation releases sliding bar 42 from V-shaped cut out 14 to enable sliding bar 42 to slide along runner track 45 as the seat folds up towards the stowed position.

Cantilevered stowable seat 62 is typically utilized and maintained in the deployed position. Cantilevered stowable seat 62 provides seating on a vehicle such as a bus or the like when seatback 60 is in the unfolded position. It may be desirable, however, to provide space for an individual in a wheel chair or for storing articles on board as FIG. 3B illustrates the stowed position.

Referring to FIGS. 3A, 3B, 5A, and 5B, seatbase 61, seatback 60, and improved locking mechanism assembly 65 rotate about pin 66. As the rotation of seat framework 15 approaches the stowed position, hook shaped end 38 of wall cam 31 comes into contact with base bar 41. Base bar 41 slides into the grip of hook shaped end 38. Wall assembly 25 then locks seat framework 15 into the stowed position. This locking is accomplished through the relationship of wall cam 31 and wall keep 32. Both wall cam 31 and wall keep 32 have toothed side 35 and 36 respectively as seen in FIGS. 6 and 7. These toothed sides meet and are constrained in the locked position and free in the unlocked position.

Referring to FIG. 4A, wall assembly 25 includes inner plate 26 and outer plate 27 removably attached at either end to protect and partially enclose the components of wall assembly 25. In the stowed position as illustrated in FIGS. 4B and 4C, wall assembly 25 is locked and wall cam 31 has a grip on base bar 41 via hook shaped end 38 to prevent movement towards the deployed position as seen in FIG. 3A. FIGS. 5A and 5B illustrate how handle 8 has a relationship with aisle keep 10, transfer rod 40, and wall keep 32 to transfer a force applied at handle 8. Inner plate 26 includes a U-shaped cut out 33 enabling wall keep 32 to be rotatably attached to transfer rod 40. Wall keep 32 is biased by a keep spring 29 that is removably attached to inner plate 26; while wall cam 31 is biased by a wall spring 28 that is removably attached to inner plate 26. Wall cam 31 is rotatably associated with inner place 26 about aperture 30. An operator applies a force to handle 8 causing aisle keep 10 to rotate counterclockwise. This rotation drives both aisle sear 9 and transfer rod 40. Transfer rod 40 moves in a direction parallel with inner plate 26, driving wall keep 32 to move in the counterclockwise direction, which in turn drives wall cam 31 in the clockwise direction. Tooth contact region 44 transfers this clockwise motion. This clockwise rotation releases base bar 41 from hook shaped end 38 enabling sliding bar 42 to travel along runner track 45 as cantilevered stowable seat 62 rotates towards the folded intermediate position, the seatback is then unfolded to the deployed position.

In order to accomplish the objectives of this invention, it can be seen that the mechanisms involved in this invention have less weight than previous devices so that a facile machine is produced that can accomplish the motions of the links with greater ease. It may thus be seen that the objects of the present inventions set forth herein as well as those made apparent from the foregoing description, are officially obtained. While preferred embodiments of the invention have been set forth for the purposes of disclosure, modification of disclosed embodiments of the invention as well as other embodiments thereof may occur to those skilled in the art. Accordingly, the appended claims are intended to cover all embodiments which do not depart from the spirit and scope of the invention.

What we claim is:

1. A cantilevered stowable seat including at least one seat base member and at least one seatback member pivotably mounted on an axis associated with a seat framework, movable through a range of positions between a stowed position and a deployed position, said deployed position enabling an occupant to sit while said stowed position accommodates a wheel chair or provides space, having said seat framework with an improved locking mechanism assembly comprising:
   a wall assembly removably attached to said seat framework and having a mechanism utilizing a combination of a wall cam, a wall keep, a transfer rod, and a handle to lock and/or unlock said cantilevered stowable seat in said stowed position,
   an aisle assembly removably attached to said seat framework and having a mechanism utilizing a combination of an aisle keep, an aisle sear, said transfer rod and said handle to lock and/or unlock the seat in the deployed position,
   said wall assembly and said aisle assembly being related to each other for cooperation by said transfer rod having one of its ends proximate to said aisle assembly and the other end proximate to said wall assembly,
   said handle associated with said transfer rod cooperating with said wall assembly and said aisle assembly thereby enabling one hand control for moving said cantilevered stowable seat from a folded intermediate position to said stowed position.

2. The cantilevered stowable seat of claim 1, wherein said wall keep includes a toothed side enabling said wall keep to rotatably contact a toothed side of said wall cam to lock or unlock said wall assembly.

3. The cantilevered stowable seat of claim 2, wherein said aisle keep includes a toothed side enabling said aisle keep to rotatably contact a toothed side of said aisle sear to lock or unlock said aisle assembly.

4. The cantilevered stowable seat of claim 3, wherein said handle is lifted, thereby driving said aisle keep to rotate counterclockwise, and in turn driving said transfer rod, said transfer bar driving said wall keep to rotate counterclockwise and transferring motion via a tooth contact region, driving said wall cam to rotate clockwise thereby enabling a hook shaped end to release a base bar from a locked, stowed position.

5. The cantilevered stowable seat of claim 3, wherein said handle is lifted, driving said aisle keep counterclockwise via a tooth contact region, driving clockwise thereby enabling a V-shaped slot to release a sliding bar from the locked, deployed position.

6. The cantilevered stowable seat of claim 5, wherein said wall assembly comprises:
   an inner plate and an outer plate removably attached at both ends,
   said inner plate having a U-shaped cut out enabling a fastener to removably attach said transfer rod to said wall keep,
   said wall keep rotatably attached to said wall assembly at a pin with a spring lock,
   said wall cam rotatably attached to said wall assembly at a pin with a spring lock,
   said wall cam comprising a toothed side facing said wall keep, and a hook shaped end enabling a grip on said base bar for locking the seat in the stowed position.

7. The cantilevered stowable seat of claim 1, wherein said aisle assembly comprises:
   an inner and outer plate removably attached at both ends,
   said inner plate having a U-shaped cut out enabling a fastener to removably associate said transfer rod to said aisle keep,
   said handle having a spring lock and rotatably associated at a pin, and further with said aisle keep via a aisle keep slot,
   said aisle keep rotatably attached to said aisle assembly at said pin,
   said aisle sear rotatably attached to said aisle assembly at said pin with a spring lock, said aisle sear comprising a toothed side facing said aisle keep and a V-shaped cut out,
   said V-shaped cut out enables said aisle sear to lock said sliding bar in position when said seatbase is in the folded intermediate or deployed positions.

* * * * *